April 15, 1941.  N. CHAYES  2,238,440
PORTABLE HAND TOOL ELECTRIC MOTOR DRIVEN GRINDER
Filed May 8, 1940
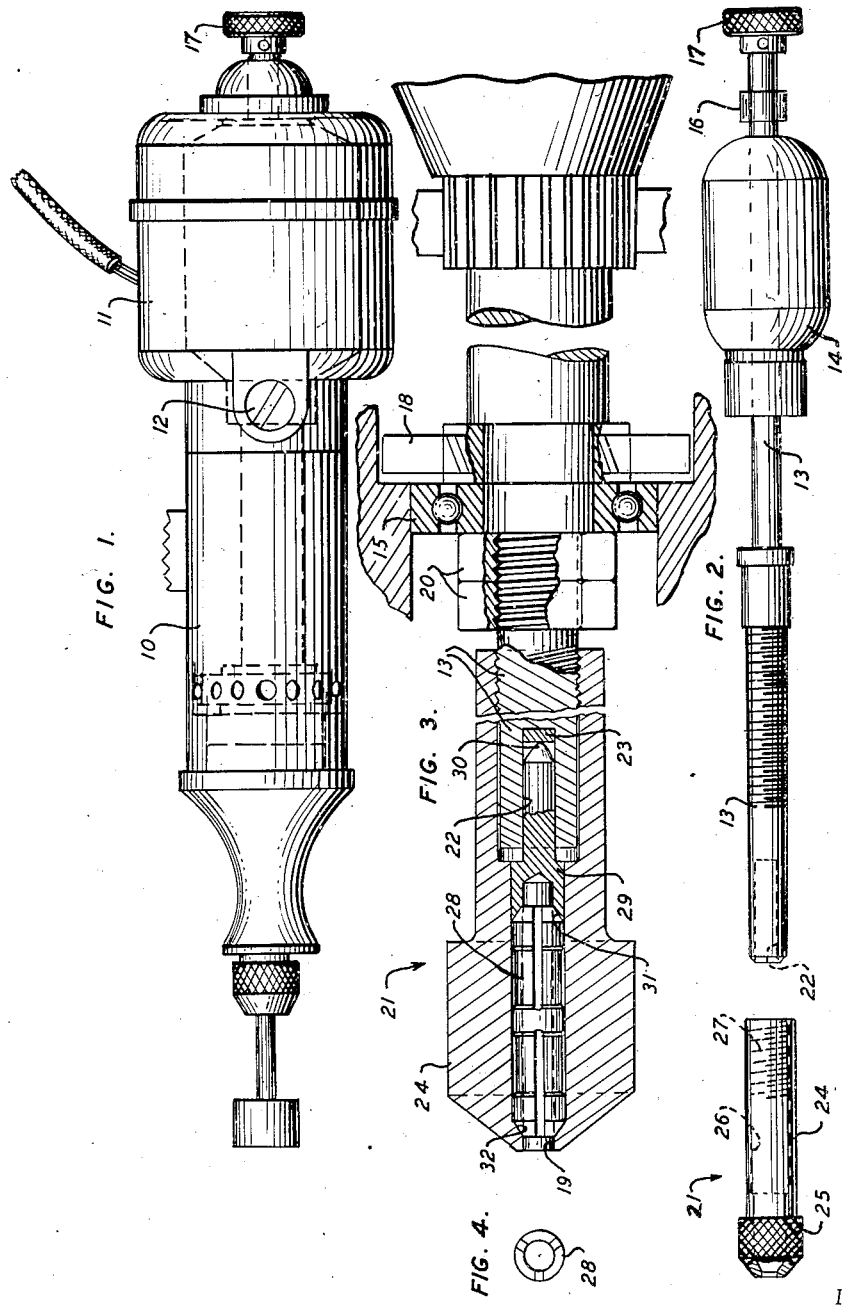
INVENTOR.
NATHANIEL CHAYES
BY
H. J. Jeanson
ATTORNEY.

Patented Apr. 15, 1941

2,238,440

UNITED STATES PATENT OFFICE 2,238,440

PORTABLE HAND TOOL ELECTRIC MOTOR DRIVEN GRINDER

Nathaniel Chayes, New Rochelle, N. Y.

Application May 8, 1940, Serial No. 333,907

7 Claims. (Cl. 32—23)

This invention relates to portable hand tool electric motor driven grinders and more particularly to an easily adjustable chuck operated means for same.

In the hand tool grinders now being used the chuck or grinder bit holding means is adjustable to release or grip the tool by holding the drive shaft with one hand and with the other hand screwing the chuck sleeve over a spring collet which is mounted on the drive or grinder shaft at the tool gripping position. This type of chuck usually compels the user of this tool to grip two knurled screw members that are in close proximity and rotate each in an opposite direction to adjust the chuck, one hand generally interferring with the other. By placing the one knurled gripping member at the end of the drive shaft remote from the chucking means and the other knurled gripping member over the tool gripping collet it is possible to grasp the two members, one in each hand without interference and at the same time permit an effortless setting.

An object of the present invention is to produce a simple, economical and compact hand unit for holding and driving cutting and grinding tools in which the construction and arrangement of parts is such that the tool chuck is mounted on one end of the motor shaft and the adjusting member at the other end of the motor shaft.

Another object is to provide a chucking means, which provides a maximum gripping action, and is easily adjusted to hold or release the tool shank.

Other objects will be apparent from the following description of an embodiment thereof, illustrated in the accompanying drawing wherein:

Fig. 1 is an elevational view of the complete motorized unit,

Fig. 2 is an elevational view of the central shaft, motor armature and chuck,

Fig. 3 is an enlarged cross sectional view of the chuck assembly with fan and bearing mounting, and Fig. 4 is an end view of the spring collet.

Referring to Fig. 1 a housing 10 is illustrated, which has an electric motor 11 mounted on one end thereof, with a pair of armature brushes 12 adjustable from outside the housing 10. A central shaft 13 having the motor armature 14 mounted thereon extends through both the electric motor 11 and the main housing 10 having a bearing 15 in the main housing and a bearing 16 in the motor for support. The central shaft 13 has a knurled handpiece 17 at the outer end near the motor which is keyed or affixed to the shaft. The intermediate portion of the shaft 13 has a fan 18 mounted thereon to rotate with the shaft. The bearing 15 is mounted on shaft 13 with the fan 18 being held in juxtaposition by a pair of lock nuts 20. Also mounted on the end of the shaft 13 on a threaded extension of the shaft is a screw chuck assembly 21. The end of the shaft 13 has a small hole 22 bored in the center thereof. In this boring a hardened thrust disk 23 is inserted and securely seated at the end of the boring. The screw chuck assembly 21 comprises a main casting 24 having an outer knurled gripping surface 25 and a central bore 26. The central bore 26 does not extend entirely through the casting 24 with the same radial bore but has a reduced radial bore 19 at the tool end of the casting 24. The other end of the casting has an internal thread 27 of the proper size to co-act with the threaded extension of the shaft 13. Mounted within the bore 26 is a double ended spring collet 28 and a collet pressing pin 29. The spring collet 28 is a standard type with a central bore to receive tool shanks and which under compressive force will exert a double ended clamping action on the tool shank, but when the compressive force is released, the collet resumes its normal shape releasing its clamping action on the tool shank. The collet pressing pin 29 is a loosely rotatable hardened pin having a point 30 on the one end which is mounted in the bore 22 of the shaft 13 to bear against the hardened disk 23. The pin 29 has a cup shaped end 31, which bears against the one end of the collet 28. The other end of the collet 28 bearing against a shoulder 32 of the casting 24.

In operation the knurled end 25 is held in one hand while the knurled end 17 is held in the other hand. Assuming a grinder tool shank is already mounted in the instrument, to release the chuck the knurled end 25 is held firmly and the knurled end 17 is rotated counter-clockwise, this causing the shaft 13 to be rotated, thus unscrewing the shaft and releasing the pressure that was applied to the point 30 of the pin 29. This in turn releases the pressure on the double ended spring collet 28 permitting it to spring back to its normal shape, thus the gripping action of the spring collet is removed and the tool shank may be withdrawn. A new tool shank may be inserted through the spring collet 28, so that it is seated against the pin 29, and again the knurled end 25 held and the knurled end 17 rotated in a clockwise direction. This causes the shaft 13 to be screwed into the chuck member 21 and at the same time causes the disc 28 to bear against the point 30 of the pin 29 which in turn causes the shoulder 31 of the pin 29 to bear against the end of the spring collet 26. Since the double ended spring collet bears against two cup shaped shoulders it will distribute the pressure and tend to bow in at either end thus exerting a gripping action on the tool shank at each end of the spring collet. Due to the point 30 bearing against a hardened disc 28 an adjustment can be made that is practically frictionless, therefore the greatest amount of the pressure exerted in screwing shaft 13 is applied to the spring collet 26 and thus to the tool shank.

The embodiment of the invention herein disclosed is merely illustrative and may be modified and departed from in many ways without departing from the spirit and scope of the invention as pointed out in and limited solely by the appended claims.

What is claimed is:

1. A motor driven dental handpiece including a motor, a motor shaft, said motor shaft having a hand grip extension at one end of the shaft and an externally threaded extension at the opposite end of the shaft, the threaded shaft extension having a central bore with a bearing disc at the bottom of said bore, a tool chuck mounted on the threaded shaft extension having a central pin to bear against the disc in the said bore of the motor shaft, said chuck being dependent upon the external thread of the motor shaft for adjustment and the said bearing disc for bearing thrust.

2. A motor driven dental handpiece including a motor, a motor shaft, said motor shaft having a hand grip extension at one end of the shaft and an externally threaded extension at the opposite end of the shaft, the threaded shaft extension having a central bore with a bearing disc at the bottom of said bore, a tool chuck mounted on the threaded shaft extension having a central pin to pivot the chucking force on a central point reducing the torque to grip or release the tool shank in the chuck.

3. A motor driven dental handpiece including a motor, a motor shaft, said motor shaft having a hand grip extension at one end of the shaft and an externally threaded extension at the opposite end of the shaft, the threaded shaft extension having a central bore with a bearing disc at the bottom of said bore, a tool chuck mounted on the threaded shaft extension having a removable double ended spring collet and a bearing pin retained within the chuck, said pin pivoting against the bearing disc at one end and bearing against the spring collet at the other end, said chuck being dependent upon the external thread of the motor shaft for adjustment and the said bearing disc for bearing thrust.

4. A motor driven dental handpiece including a motor, a motor shaft, said motor shaft having a hand grip extension at one end of the shaft and an externally threaded extension at the opposite end of the shaft, the threaded shaft extension having a central bore with a bearing disc at the bottom of said bore, a hand grip collared tool-chucking means fitted on the externally threaded extension and having a pin with a pointed end which fits within the central bore of the shaft extension providing a single bearing point on the bearing disc.

5. A motor driven dental handpiece including a motor, a motor shaft, said motor shaft having a hand grip extension at one end of the shaft and an externally threaded extension at the opposite end of the shaft, the threaded shaft extension having a central bore with a bearing disc at the bottom of said bore, a collared tool-chuck having a hand grip on the external surface, a tool collet within, and an internal thread, said chuck having a bearing pin which fits within the bore of the said motor shaft, one end of the pin being pointed to bear against the bearing disc and the other end being cup shaped to bear against the chuck collet.

6. A motor driven dental handpiece including a motor, a motor shaft, said motor shaft having a hand grip extension at one end of the shaft and an externally threaded extension at the opposite end of the shaft, the threaded end having a central bore with a bearing disc at the bottom of said bore, a collared tool chucking means mounted on the external thread of said shaft, said chucking means comprising a retaining sleeve within which a double ended spring collet is mounted, said retaining sleeve having a shoulder of reduced diameter to bear against one end of the spring collet, and the opposite end of said retaining sleeve having an internal thread to fit the external thread of said shaft, and a conical pin loosely mounted in the said bore of the driver shaft, said pin having a pointed end to bear against the said bearing disc and the opposite end of the pin having an enlarged cup shaped shoulder to bear against the other end of the spring collet.

7. In a tool chuck a driver shaft having an external thread, the threaded end having a central bore with a bearing disc at the bottom of said bore, a collared tool chucking means mounted on the external thread of said shaft, said chucking means comprising a retaining sleeve within which a double ended spring collet is mounted, said retaining sleeve having a shoulder of reduced diameter to bear against one end of the spring collet, and the opposite end of said retaining sleeve having an internal thread to fit the external thread of said shaft, and a conical pin loosely mounted in the said bore of the driver shaft, said pin having a pointed end to bear against the said bearing disc and the opposite end of the pin having an enlarged cup shaped shoulder to bear against the other end of the spring collet.

NATHANIEL CHAYES.